United States Patent
Riguer

(10) Patent No.: US 11,474,354 B2
(45) Date of Patent: Oct. 18, 2022

(54) DISPLAY PACING IN MULTI-HEAD MOUNTED DISPLAY VIRTUAL REALITY CONFIGURATIONS

(71) Applicant: ATI TECHNOLOGIES ULC, Markham (CA)

(72) Inventor: Guennadi Riguer, Thornhill (CA)

(73) Assignee: ATI TECHNOLOGIES ULC, Markham (CA)

( * ) Notice: Subject to any disclaimer, the term of this patent is extended or adjusted under 35 U.S.C. 154(b) by 517 days.

(21) Appl. No.: 15/496,972

(22) Filed: Apr. 25, 2017

(65) Prior Publication Data

US 2018/0307042 A1    Oct. 25, 2018

(51) Int. Cl.
*G02B 27/01* (2006.01)
*G06T 19/00* (2011.01)
(Continued)

(52) U.S. Cl.
CPC .......... *G02B 27/017* (2013.01); *G02B 27/64* (2013.01); *G06F 3/011* (2013.01); *G06F 3/012* (2013.01);
(Continued)

(58) Field of Classification Search
CPC ............ G02B 27/017; G02B 27/64; G02B 2027/0138; G02B 2027/014; G02B 2027/0187; G06F 3/012; G06F 3/147; G06F 3/011; G06F 3/016; G06F 1/3265; G06T 19/006; G06T 11/60; G06T 15/005; G06T 1/20; G06T 2215/16; G06T 11/00; G06T 15/00; G06T 15/205; G06T 3/0093; G06T 15/20; H04N 5/232; H04N 13/344; H04N 13/106; H04N 19/132; G09G 2320/0252; G09G 2350/00; G09G 2340/0407; G09G 3/003; G09G 5/363; G09G 2340/0435
See application file for complete search history.

(56) References Cited

U.S. PATENT DOCUMENTS 8,982,151 B2 * 3/2015 Tardif .................. G06F 3/1423
345/629
9,766,458 B2    9/2017 Ikeda et al.
(Continued)

FOREIGN PATENT DOCUMENTS

CN    105027563 A    11/2015
JP    2016162033 A    9/2016

OTHER PUBLICATIONS

PCT/IB2018/052735 International Search Report & Written Opinion dated Jul. 19, 2018.
(Continued)

*Primary Examiner* — Xilin Guo

(57) ABSTRACT

Various virtual reality computing systems and methods are disclosed. In one aspect, a method of delivering video frame data to multiple VR displays is provided. The method includes generating content for multiple VR displays and sensing for competing needs for resources with real time requirements of the multiple VR displays. If competing needs for resources with real time requirements are sensed, a selected refresh offset for refreshes of the multiple VR displays is determined to avoid conflict between the competing needs for resources of the multiple VR displays. The selected refresh offset is imposed and the content is delivered to the multiple VR displays.

17 Claims, 7 Drawing Sheets

(51) Int. Cl.
  *G06F 3/01* (2006.01)
  *H04N 5/232* (2006.01)
  *G02B 27/64* (2006.01)
  *G09G 5/36* (2006.01)
  *G09G 5/00* (2006.01)
  *G09G 3/00* (2006.01)
  *G06F 3/147* (2006.01)

(52) U.S. Cl.
  CPC ............ *G06F 3/147* (2013.01); *G06T 19/006* (2013.01); *G09G 3/002* (2013.01); *G09G 5/00* (2013.01); *G09G 5/363* (2013.01); *H04N 5/232* (2013.01); *G02B 2027/014* (2013.01); *G02B 2027/0138* (2013.01); *G02B 2027/0187* (2013.01); *G09G 2320/0252* (2013.01); *G09G 2360/18* (2013.01)

(56) References Cited

U.S. PATENT DOCUMENTS

2008/0246771 A1* 10/2008 O'Neal ................ G06F 3/1454 345/503
2014/0152676 A1 6/2014 Rohn et al.
2016/0009310 A1 3/2016 Mao et al.
2016/0093108 A1 3/2016 Mao et al.
2016/0189429 A1 6/2016 Mallinson
2017/0011681 A1 1/2017 Bathiche et al.
2017/0053620 A1 2/2017 Law et al.
2017/0076503 A1 3/2017 Tamaoki et al.
2017/0330496 A1* 11/2017 Oravainen ............ G06T 3/4092
2018/0075820 A1* 3/2018 Hicks ....................... G06F 3/14

OTHER PUBLICATIONS

Steven Paterson; *What is Asynchronous Timewarp and Why Should You Care?*; http://www.vrcircle.com/post/what-is-asynchronous-timewarp-and-why-should-you-care; Nov. 3, 2015; pp. 1-7.
Ryan Shrout; *Oculus Launches Asynchronous Spacewarp, 45 FPS VR*; https://www.pcper.com/category/tags/asynchronous-timewarp; Nov. 10, 2016; pp. 1-3.
Reddit; *ELI5: Difference between ATW, ASW, and reprojection?*; https://www.reddit.com/r/oculus/comments/56720c/eli5_difference_between_atw_asw_and_reprojection/; Jan. 13, 2017; pp. 1-2.
Matt Porter; *Why the 'asynchronous timewarp' added to Oculus Rift matters*; http://www.pcgamer.com/why-the-asynchronous-timewarp-added-to-oculus-rift-matters/; PC Gamer; Mar. 28, 2016; pp. 1-6.

* cited by examiner

DISPLAY PACING IN MULTI-HEAD MOUNTED DISPLAY VIRTUAL REALITY CONFIGURATIONS

BACKGROUND OF THE INVENTION

Virtual Reality (VR) systems utilize a Head Mounted Display (HMD) with an illuminated screen that shows the wearer the computer generated virtual world. With each movement of a user's head the HMD changes the display to show the user the changed scenery. When running an application, such as a game, a VR computer must not only render video frames generated by the application but also account for the movements of a user's head. With or without head movement, the VR computer must process frames in near real time in order to avoid judder, which results when images are delayed and the user will view the images just a second, or even a fraction of a second too late. Judder can be very jarring and cause nausea.

BRIEF DESCRIPTION OF THE DRAWINGS

The foregoing and other advantages of the invention will become apparent upon reading the following detailed description and upon reference to the drawings in which.

DETAILED DESCRIPTION

Figure 1:
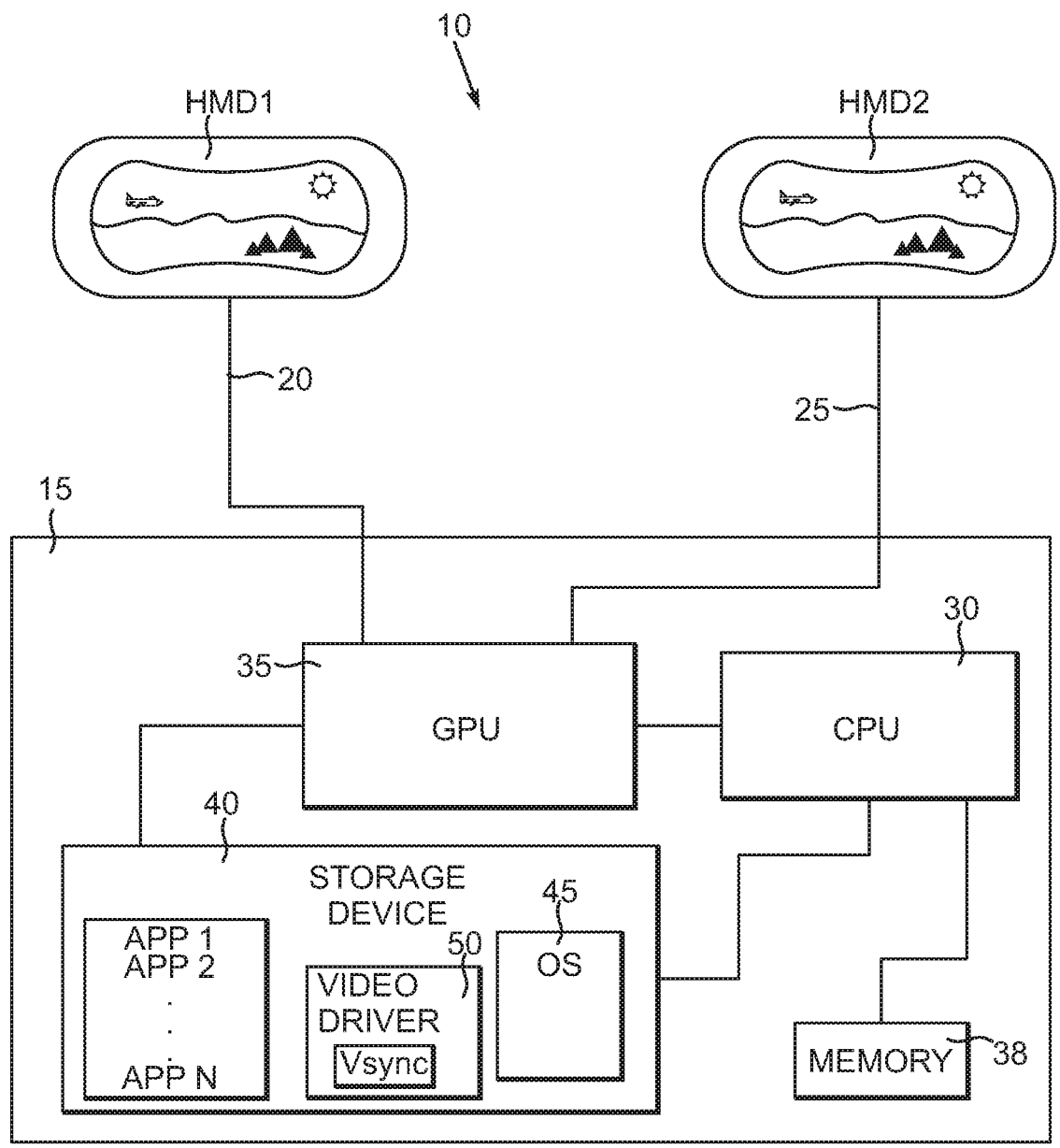
FIG. 1 is a schematic view of an exemplary VR computing system.

A VR system relies on an ability to perform in near real-time to provide a good user experience. As noted above, a single HMD driven system represents a straightforward situation. Complexities mount when multiple HMDs are connected to a computer system. A conventional VR HMD operates on a fixed time line usually tied to a display refresh rate. Vertical synchronization or Vsync is a method of controlling buffer flipping to avoid the problem of frame tearing where the display shows portions of two rendered frames that have different content. When Vsync is enabled, each buffer flip can only occur after each refresh. This effectively caps the frame rendering rate at the HMD refresh rate.

Some VR system vendors introduced a technique called asynchronous time warp (ATW) to help alleviate the impact of missed frames on VR HMDs. A system using ATW shifts the image on the VR HMD without input from the game engine based on relative head motion that occurred after the last VR HMD position was sent to the game. Doing so presents a more accurate image to the user. ATW moves the entire frame as a whole, shifting it only based on relative changes to the user's head rotation. A more recent development is the so-called Asynchronous Spacewarp (ASW). Systems with ASW attempt to shift objects and motion inside of the scene by generating new frames to insert in between "real" frames from the game engine when the game is running at a frame rate lower than the refresh rate.

ATW is executed at a minimal latency to the front portion of the Vsync interval. Similarly, other parts of the frame generation executed on both the central processing unit (CPU) and the graphics processing unit (GPU) are paced relative to HMD's Vsync. This works well for a system with a single HMD. When multiple HMDs are attached, even if the system (e.g. CPU and GPU) has enough total horsepower, unreliable operation could occur due to contention for real-time critical resources (e.g. computations for ATW) across multiple HMDs. There are conventional solutions to synchronize display processing and output, such as gen lock and frame lock, but there are no solutions for pacing display operation in a predictable manner as required for multiple VR headsets.

In accordance with one aspect of the present invention, a method of delivering video frame data to multiple VR displays is provided. The method includes generating content for multiple VR displays and sensing for competing needs for resources with real time requirements of the multiple VR displays. If competing needs for resources with real time requirements are sensed, a selected refresh offset for refreshes of the multiple VR displays is determined to avoid conflict between the competing needs for resources of the multiple VR displays. The selected refresh offset is imposed and the content is delivered to the multiple VR displays.

The method wherein the resources comprise computation for rendering and asynchronous time warp requests.

The method wherein the multiple displays support dynamic refresh and comprising if competing needs for resources with real time requirements are sensed, also determining a selected dynamic refresh rate for refreshes of the multiple VR displays to aid in avoiding the competing needs for resources made by the multiple VR, and imposing the selected refresh offset and dynamic refresh rate.

The method wherein the resources comprise computation for rendering and asynchronous time warp requests.

The method wherein the generating the content is performed by a single GPU.

The method of claim wherein the generating the content for multiple VR displays comprises generating the content for one of the multiple VR displays using a GPU and generating or delivering the content for another of the multiple VR displays using another GPU.

The method wherein the GPU is configured as a master and the another GPU is configured as a slave such that the master controls the selected refresh offset of frames generated or delivered by the slave GPU.

In accordance with another aspect of the present invention, a method of delivering video frame data to multiple VR displays is provided. The method includes running a first application on a computing device to generate content for multiple VR displays and sensing for competing needs for resources with real time requirements of the multiple VR displays using a second application. If competing needs for resources with real time requirements are sensed, using the second application to determine a selected refresh offset for refreshes of the multiple VR displays to avoid conflict between competing needs for resources of the multiple VR displays. The selected refresh offset is imposed and the content delivered to the multiple VR displays.

The method wherein the resources comprise computation for rendering and asynchronous time warp requests.

The method wherein the multiple displays support dynamic refresh, the method comprising if movements are sensed, also determining a selected dynamic refresh rate for refreshes of the multiple VR displays to aid in avoiding the competing requests for resources made by the multiple VR displays due to the movements, and imposing the selected refresh offset and dynamic refresh rate.

The method wherein the resources comprises computation for rendering and asynchronous time warp requests.

The method wherein the application is run by a single GPU.

The method wherein the generating the content for multiple VR displays comprises generating the content for one of the multiple VR displays using a GPU and generating or delivering the content for another of the multiple VR displays using another GPU.

The method wherein the GPU is configured as a master and the another GPU is configured as a slave such that the master controls the selected refresh offset of frames generated or delivered by the slave GPU.

In accordance with another aspect of the present invention, a virtual reality computing system is provided. The system includes a computing device and a processor. The processor is operable to perform instructions to generate content for multiple VR displays, to sense for competing needs for resources with real time requirements of the multiple VR displays, if competing needs for resources with real time requirements are sensed, to determine a selected refresh offset for refreshes of the multiple VR displays to avoid conflict between the competing needs for resources of the multiple VR displays, to impose the selected refresh offset, and to deliver the content to the multiple VR displays.

The virtual reality computing system comprising the multiple VR displays.

The virtual reality computing system wherein the processor comprises a CPU, a GPU or a combined CPU and GPU.

The virtual reality computing system wherein the computing device comprises another processor wherein the processor generates the content for one of the multiple VR displays and the another processor generates or delivers the content for another of the multiple VR displays.

The virtual reality computing system wherein the processor is configured as a master and the another processor is configured as a slave such that the master controls the selected refresh offset of frames generated or delivered by the slave processor.

The virtual reality computing system wherein the multiple displays support dynamic refresh, the processor being operable to, if competing needs for resources with real time requirements are sensed, also determine a selected dynamic refresh rate for refreshes of the multiple VR displays to aid in avoiding conflict between the competing needs for resources of the multiple VR displays, and to impose the selected refresh offset and dynamic refresh rate.

Various virtual reality (VR) computing systems that improve on the management of delivering video frames to multiple VR head mounted displays are disclosed. Video content can be generated for delivery to multiple VR head mounted displays. The VR computer monitors, perhaps by way of a VR compositor or other application for competing tasks requiring real time processing, such as partial or whole frame rendering or asynchronous time warps, by multiple VR displays. If competing tasks that require real time or near real time computing requirements are sensed, say by the detection of multiple VR displays, the application and the system compute a selected refresh offset for refreshes of the multiple VR displays to avoid competing requests for resources made by the multiple VR displays. The selected refresh offset is imposed and the content is delivered to the multiple VR displays. One head mounted VR display can refresh first, and the second a fraction of a second or a fraction of a frame later and so on for other VR displays connected to the computing device. The staggering avoids competing requests for resources, such as those needed for asynchronous time warps and frame rendering parts that have real time requirements. Additional details will now be described.

In the drawings described below, reference numerals are generally repeated where identical elements appear in more than one figure. Turning now to the drawings, and in particular to FIG. 1, therein is shown a schematic view of an exemplary VR computing system 10 (hereinafter system 10). The system 10 includes a computing device 15 and one or more head mounted displays, two of which are depicted and labeled HMD1 and HMD2, respectively, where HMD stands for head mounted display. The connections 20 and 25 between the computing device 15 and HMD1 and HMD2 can be wired or wireless connections as desired. The computing device 15 can include a processor or CPU 30, a GPU 35, system memory 38 and a storage device 40. The CPU 30 and the GPU 35 can be general purpose discrete devices or integrated into a single device, such as by way of an accelerated processing unit. Optionally, the functions of the CPU 30 and the GPU 35 can be performed by one or more application specific integrated circuits. System memory can be RAM, ROM, flash combinations of these or other types of memory. The storage device 40 is a non-volatile computer readable medium and can be any kind of hard disk, optical storage disk, solid state storage device, ROM, RAM or virtually any other system for storing computer readable media. The storage device 40 is operable to store non-transient computer readable instructions for performing various functions disclosed herein.

The computing device 15 can include plural applications, which are abbreviated APP 1, APP 2 . . . APP N, and which can be drivers, software applications, or other types of applications. In addition, the computing device 15 can include an operating system 45 and a video driver 50. The operating system 45 and the video driver 50 and the applications APP 1, APP 2 . . . APP n can be stored on the storage device 40 and selectively loaded into system memory 38. Windows®, Linux, or more application specific types of operating system software can be used or the like. One of the applications APP 1 . . . APP n, for example APP 1, can be an application that generates content to be displayed on HMD1 and HMD2, such as a game or other program, and another application, say APP 2, can be a VR compositor that, by way of the video driver 50, controls aspects of how content is displayed on HMD1 and HMD2. The video driver 50 can include code to implement Vsync or vertical synchronization. Vsync is designed to avoid a phenomena known as "tearing" where the display shows portions of two rendered frames that have different content. When Vsync is enabled, each buffer flip can only occur after each refresh.

Figure 2:
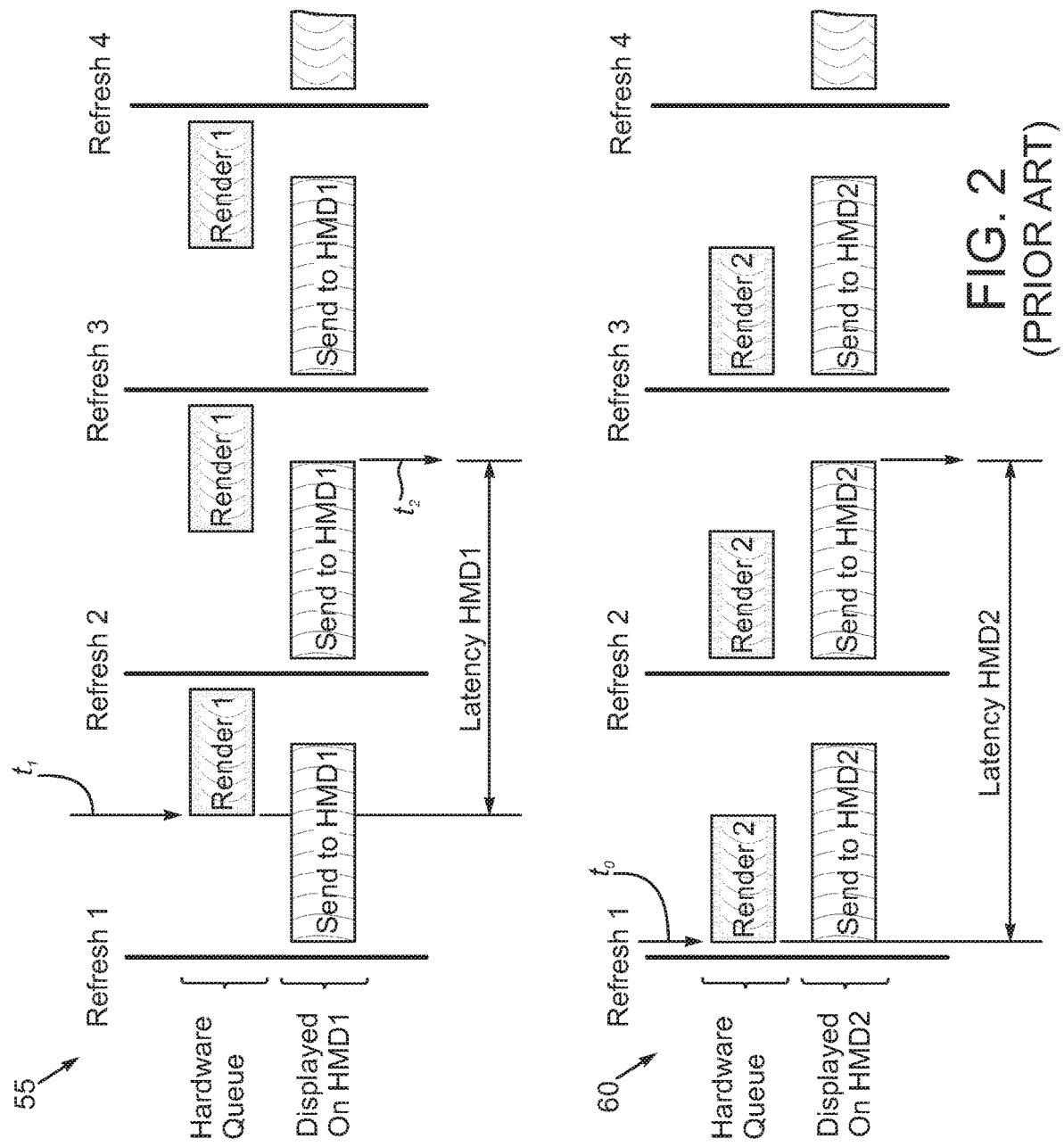
FIG. 2 depicts a conventional exemplary timing diagram for multiple VR display refresh cycles.

The application APP 1 and/or the application APP 2 can be resident on the storage device 40 and selectively loaded in the system memory 38 during execution. The application APP 2 is operable to provide timing synchronization for driving the displays of HMD1 and HMD2 as well as selectively skewing the refresh intervals of the multiple VR displays for HMD1 and HMD2. A technical goal is to provide some selected offset in refresh timing between HMD1 and HMD2 to avoid overlap of real time workloads, such as frame rendering and asynchronous time warp (ATW)

requests. Aspects of the operation of the system 10 will be described in conjunction with FIG. 3. However, before turning to FIG. 3, it will be useful to consider conventional frame rendering in a multi-HMD system. Such conventional frame rendering is depicted in FIG. 2, which illustrates a refresh timing diagram 55 for HMD1 and a corresponding refresh timing diagram 60 for HMD2. For each of the timing diagrams 55 and 60 a few refresh points, Refresh 1, Refresh 2, Refresh 3 and Refresh 4, are depicted and it is assumed that both HMD1 and HMD2 have the same constant refresh rate, i.e., the inverse of the time period between Refresh 1 and Refresh 2 and between Refresh 2 and Refresh 3 and so on. The refresh timing diagram 55 shows timing activities for a "Hardware Queue" and a "Displayed On HMD1" where the Hardware Queue is the hardware (e.g., GPU, APU or other) activity associated with frame rendering for HMD1 and the Displayed On HMD1 shows the activity leading to the actual appearance of rendered content on HMD1. As shown in diagram 55, at some point after Refresh 1 but prior to Refresh 2, frame rendering for HMD1, abbreviated "Render 1," is performed and the content rendered just prior to Refresh 1 is displayed on HMD1, abbreviated "Send to HMD1." The refresh timing shows the timing activities for the Hardware Queue associated with frame rendering for HMD2 and the "Displayed On HMD2" shows the activity leading to the actual appearance of rendered content on HMD2. As shown in diagram 60, at some point after Refresh 1 but prior to Refresh 2, frame rendering for HMD2, abbreviated "Render 2," is performed and the content rendered just prior to Refresh 1 is displayed on HMD2, abbreviated "Send to HMD2." Here it is assumed that Render 2 commences at time $t_0$ very soon after Refresh 1 and that Render 1 commences at time $t_1$ immediately and sequentially after the completion of Render 2. Now fast forward to just after Refresh 2. As shown in refresh timing diagram 55, the content from the Render 1 operation commencing at time $t_1$ is ultimately displayed on HMD1 at the completion of Send to HMD1 at time $t_2$. Note the latency, labeled "Latency HMD1," between Render 1 commencing at time $t_1$ and Send to HMD1 at time $t_2$. Now consider timing diagram 60 just after Refresh 2. The content from the Render 2 operation commencing at time $t_0$ is ultimately displayed on HMD2 at the completion of Send to HMD2 at time $t_2$. But note the latency, labeled "Latency HMD2," between Render 2 commencing at time $t_0$ and Send to HMD2 at time $t_2$. Render 2 and Render 1 compete for processing between Refresh 1 and Refresh 2 and thus must be staggered in time. This means that Render 2 must be performed early in the Refresh 1 to Refresh 2 period and this results in Latency HMD2>Latency HMD1 and perhaps Latency HMD2 being long enough to cause judder for the user of HDM2.

Figure 3:
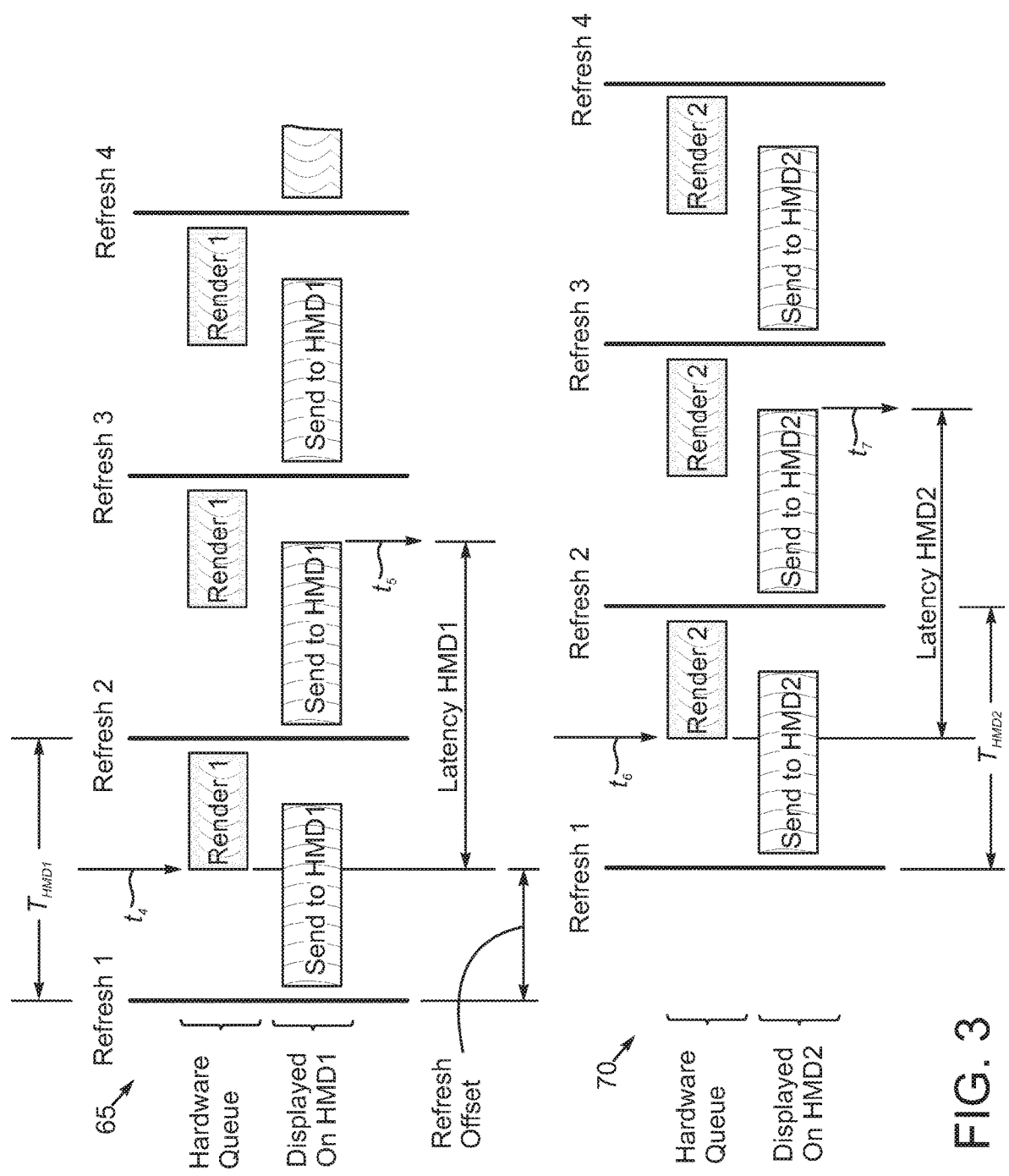
FIG. 3 depicts an exemplary timing diagram for multiple VR display refresh cycles for an exemplary variant.

Attention is now turned to FIG. 3, which illustrates exemplary improved operations and in particular a refresh timing diagram 65 for HMD1 and a corresponding refresh timing diagram 70 for HMD2. For each of the timing diagrams 65 and 70 a few refresh points, Refresh 1, Refresh 2, Refresh 3 and Refresh 4, are depicted. The refresh rate $R_{HMD1}$ of HMD1 is given by $1/T_{HMD1}$ where $T_{HMD1}$ is the period between Refresh 1 and Refresh 2 and between Refresh 2 and Refresh 3 and so on in the diagram 65 for HMD1. The refresh rate $R_{HMD2}$ of HMD2 is given by $1/T_{HMD2}$ where $T_{HMD2}$ is the period between Refresh 1 and Refresh 2 and between Refresh 2 and Refresh 3 and so on in the diagram 60 for HMD2. The refresh rates $R_{HMD1}$ and $R_{HMD2}$ can be the same or different and can be dynamically adjusted if HMD1 and HMD2 and the computing device 15 are capable of dynamic refresh rates. The refresh timing diagram 65 shows timing activities for a "Hardware Queue" and a "Displayed On HMD1" where the Hardware Queue is the hardware (e.g., GPU, APU or other) activity associated with frame rendering for HMD1 and the Displayed On HMD1 shows the activity leading to the actual appearance of rendered content on HMD1. As shown in diagram 65, at time $t_4$ after Refresh 1 but prior to Refresh 2, frame rendering for HMD1, abbreviated "Render 1," is commenced and the content rendered just prior to Refresh 1 is displayed on HMD1, abbreviated "Send to HMD1." Note that time $t_4$ is selected so that Render 1 completes near Refresh 2. Now fast forward to just after Refresh 2 in diagram 65. As shown in refresh timing diagram 65, the content from the Render 1 operation commencing at time $t_4$ is ultimately displayed on HMD1 at the completion of Send to HMD1 at time $t_5$. Note the latency, labeled "Latency HMD1," between Render 1 commencing at time $t_4$ and Send to HMD1 at time $t_5$. Now consider timing the refresh timing diagram 70. The refresh timing diagram 70 shows timing activities for the Hardware Queue and a "Displayed On HMD2" where the Hardware Queue is the hardware (e.g., GPU, APU or other) activity associated with frame rendering for HMD2 and the Displayed On HMD2 shows the activity leading to the actual appearance of rendered content on HMD2. But note that Refresh 1 for the Hardware Queue in refresh timing diagram 70, in other words the Refresh 1 for HMD2, is offset in time relative to the Refresh 1 for HMD1 shown in refresh timing diagram 65 by some selected Refresh Offset. As shown in diagram 70, at time $t_6$ after Refresh 1 but prior to Refresh 2, frame rendering for HMD2, abbreviated "Render 2," is commenced and the content rendered just prior to Refresh 1 is displayed on HMD2, abbreviated "Send to HMD2." Note that time $t_6$ is selected so that Render 2 completes near Refresh 2. Now fast forward to just after Refresh 2 in diagram 70. As shown in refresh timing diagram 70, the content from the Render 2 operation commencing at time $t_6$ is ultimately displayed on HMD2 at the completion of Send to HMD2 at time $t_7$. Note the latency, labeled "Latency HMD2," between Render 1 commencing at time $t_6$ and Send to HMD2 at time $t_7$. By using the Refresh Offset, Render 1 can be completed near Refresh 2 for HMD1 and Render 2 can be completed near Refresh 2 for HMD2, which results in Latency HMD1 being equal or close to Latency HMD2 and Latency HMD2 being shorter than Latency HMD2 for the conventional technique illustrated in FIG. 2.

Still referring to FIG. 3, the Refresh Offset can be selected based on some fraction (say up to one half) of a frame up or some other software controlled interval such as 1 to 2 milliseconds, etc. The purpose of the selected Refresh Offset is to space out in time HMD1 and HMD2 tasks with real time requirements, such as ATW requests and/or partial or whole frame rendering. It should be understood that the refresh rates $R_{HMD1}$ and $R_{HMD2}$ can not only be different but also fluctuate rapidly if dynamic refresh rates are supported by the HMD1 and HMD2 and the computing device 15.

Some exemplary selections of Refresh Offset will now be described in conjunction with FIGS. 1 and 3. One exemplary technique involves a brute force selection of the maximum Refresh Offset. For example, the maximum Refresh Offset in terms of a fraction of a frame will be given by the inverse of the number of head mounted displays connected to the computing device 15. So, for example, where HMD1 and HMD2 are connected to the computing device 15, the maximum Refresh Offset in terms of frames will be ½ of a frame. If there were three HMDs the maximum Refresh Offset would be ⅓ of a frame and for four HMDs the maximum Refresh Offset would be ¼ and so on. The selection and imposition of the Refresh Offset(s) can be performed by the VR compositor, such as APP 2 in these examples. The Refresh Offset can be adjusted up or down when the computing device 15, via APP 2 or otherwise, senses the connection or disconnection of HMDs.

Another exemplary technique for selecting the Refresh Offset involves dynamic selection. Here, as the content generating application APP 1 is producing frames for HMD1 and HMD2, the VR compositor (APP 2) can determine how long an exclusive operation will take, and then instruct the video driver 50 what the Refresh Offset should be to permit that exclusive operation to be performed without any competing real time tasks, such as ATW requests or frame rendering overlaps. Immediately after a refresh, say Refresh 1 of HMD1, the VR compositor (APP 2) will poll the tracking data of and thereby sense the movements of HMD1 and HMD2 and also sense any other incoming tasks with real time requirements. With that data in hand, APP 2 will next determine how long the ATW request and frame rendering with the ATW correction for the HMD1 movement will take, and then instruct the video driver 50 what the Refresh Offset should be so that the rendering for the movement of HMD1 is not fettered by ATW requests associated with the movement of the competing HMD, such as HMD2. The APP 2 could instruct the video driver 50 to include a safety margin, that is, make the Refresh Offset slightly larger than necessary. In the next instant, other movements of HMD1 and HMD2 can occur which might prompt APP 2 to readjust the Refresh Offset accordingly. This process of dynamically adjusting the Refresh Offset can occur repeatedly depending on the movements of HMD1 and HMD2. Of course, the technique can be dovetailed with dynamic refresh for all HMDs, such as HMD1 and HMD2, using, for example, Freesync, a technology supplied by Advanced Micro Devices, Inc.

Figure 4:
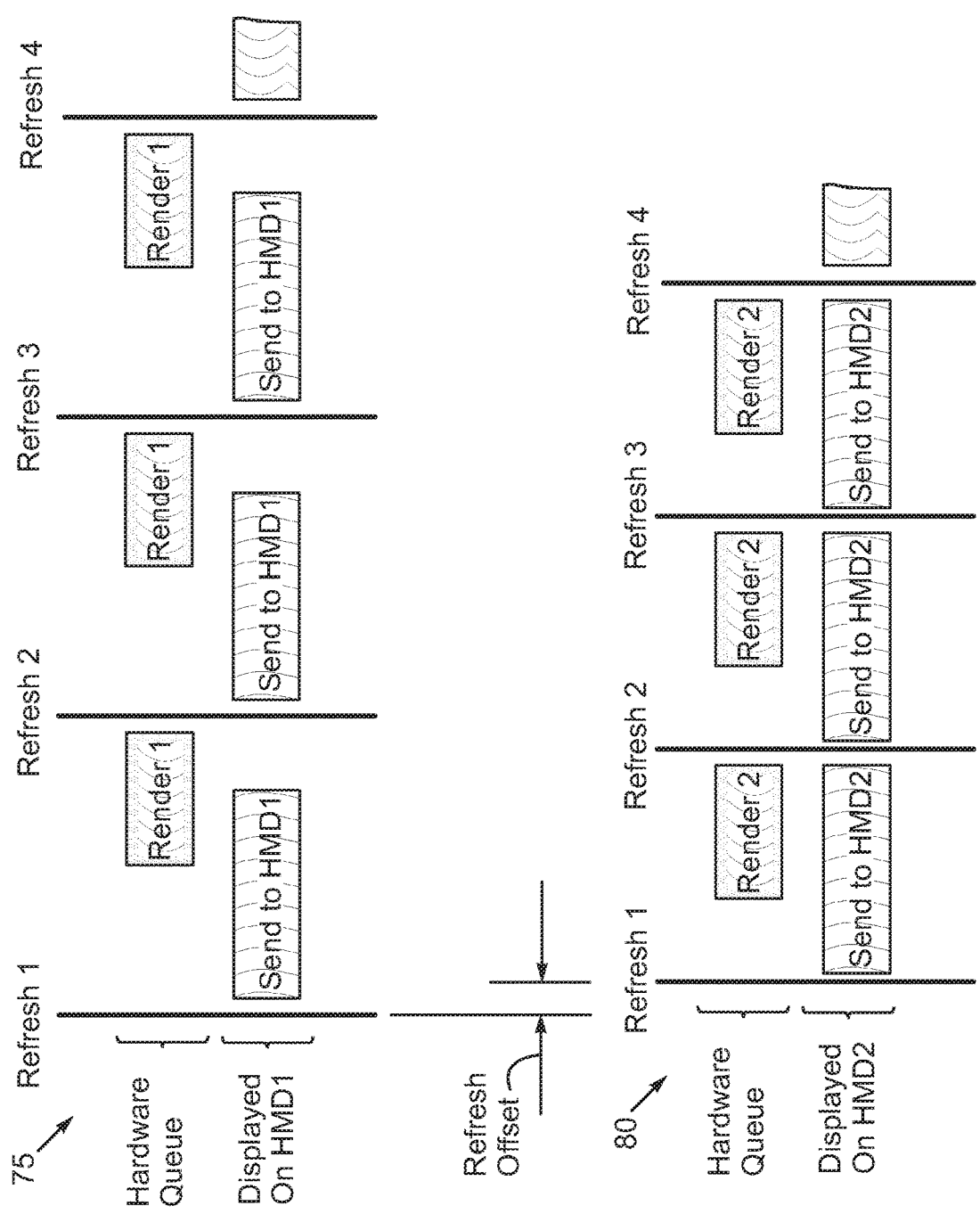
FIG. 4 depicts an exemplary timing diagram for multiple VR display refresh cycles for another exemplary variant.

Certain VR set ups can involve HMDs with different refresh rates. In these circumstances, the APP 2 can still impose Refresh Offsets to space out real time computing tasks. Attention is now turned to FIG. 4, which depicts a refresh timing diagram 75 for HMD1 and a corresponding refresh timing diagram 80 for HMD2. FIG. 4 is like FIG. 3 and thus depicts a few refresh points, Refresh 1, Refresh 2, Refresh 3 and Refresh 4, a Hardware Queue and Displayed on HMD1 or HMD2 traces for each of the timing diagrams 75 and 80. However, note that the refresh rates, defined as described above, for HMD1 and HMD2 differ. In the absence of any compensations, HMD1 and HMD2 with different refresh rates will produce an irregular "beat" pattern where intervals between refreshes of the multiple HMDs, HMD1 and HMD2, become bigger and smaller and eventually collide. Here, however, APP 2 (as VR compositor, see FIG. 1) can impose a Refresh Offset to attempt to space Refresh 1 for HMD1 and Refresh 1 for HMD2, Refresh 2 for HMD1 and Refresh 2 for HMD2 and so on, such that they do not collide. Other methods of refresh offsetting could also be used. In cases when it is not possible to avoid refresh collisions with multiple HMDs, HMD1 and HMD2, or when there is no collision, but refresh markers from different HMDs are too close to each other, a feedback can be generated to warn APP 2 that it needs to account for a possible increase in latency as a result of a possible collision of workloads.

Multi-GPU variants are envisioned for usage with multiple VR HMDs. In this regard, attention is now turned to FIG. 5 which is a block diagram depicting an alternate exemplary variant of the computing system 10'. This computing system variant 10' shares many of the attributes of the computing system 10 depicted in FIG. 1 and described elsewhere herein. For instance, there can be multiple VR displays HMD1 and HMD2 and these can number more than two as desired. In addition, the computing device 15' can include the GPU 35, system memory 38, the storage device 40, the OS 45 with Vsync, plural applications APP 1 to APP N and a video driver 50. In addition, HMD1 and HMD2 can connect to the computing device 15' by way of the aforementioned connections 20 and 25. Here however, in addition to the GPU 35, the computing device 15' can include one or more additional GPUs, one of which is depicted and labeled 85. It should be understood that more than two GPUs 35 and 85 can be implemented as desired. Both the GPUs 35 and 85 can have operative connections to the storage device 40 and system memory 38 as well as to each other. APP 2, if configured as a VR compositor as described elsewhere herein, can include instructions to perform rendering for HMD1 and HMD2, respectively. For instance, the GPU 35 can be tasked with rendering content for HMD1 and the GPU 85 can be tasked with rendering content for the other VR display HMD2. It can be desirable to designate one of the GPUs, for example GPU 35, as a master and the other GPU or GPUs 85 as slaves for timing synchronization and skewing of refresh rates and points. This differentiation in tasking, that is, master and slave can be performed where the GPU 35 and the GPU 85 have the same capabilities or more commonly where one GPU, say the GPU 35, is a more capable integrated circuit such as a discrete GPU on a card and the other GPU 85 is a less capable but still functional GPU, say for example in an integrated graphics chip. The same type of timing synchronization and selective skewing of refresh intervals as depicted in FIG. 3 and described elsewhere herein can be used with the multiple GPU variant depicted in FIG. 5. Here, however, the master GPU 35 can be tasked with selectively skewing the refresh intervals for the slave GPU 85 and any other slave GPUs that can be incorporated into the computing device 15. It can also be possible to use additional levels of granularity. Other differentiation in tasking is possible. For example, the more capable GPU 35 can be used for tasks that have real time requirements for both HMD1 and HMD2 and the lesser capable GPU 85 can be used for less demanding tasks, such as driving HMD2. In another variant, the lesser GPU 85 could also be used for some rendering as well. As with the other disclosed variants, dynamic refresh can be implemented using, for example, Freesync or other technologies where dynamic refresh of the displays HMD1 and HMD2 are provided.

Figure 6:
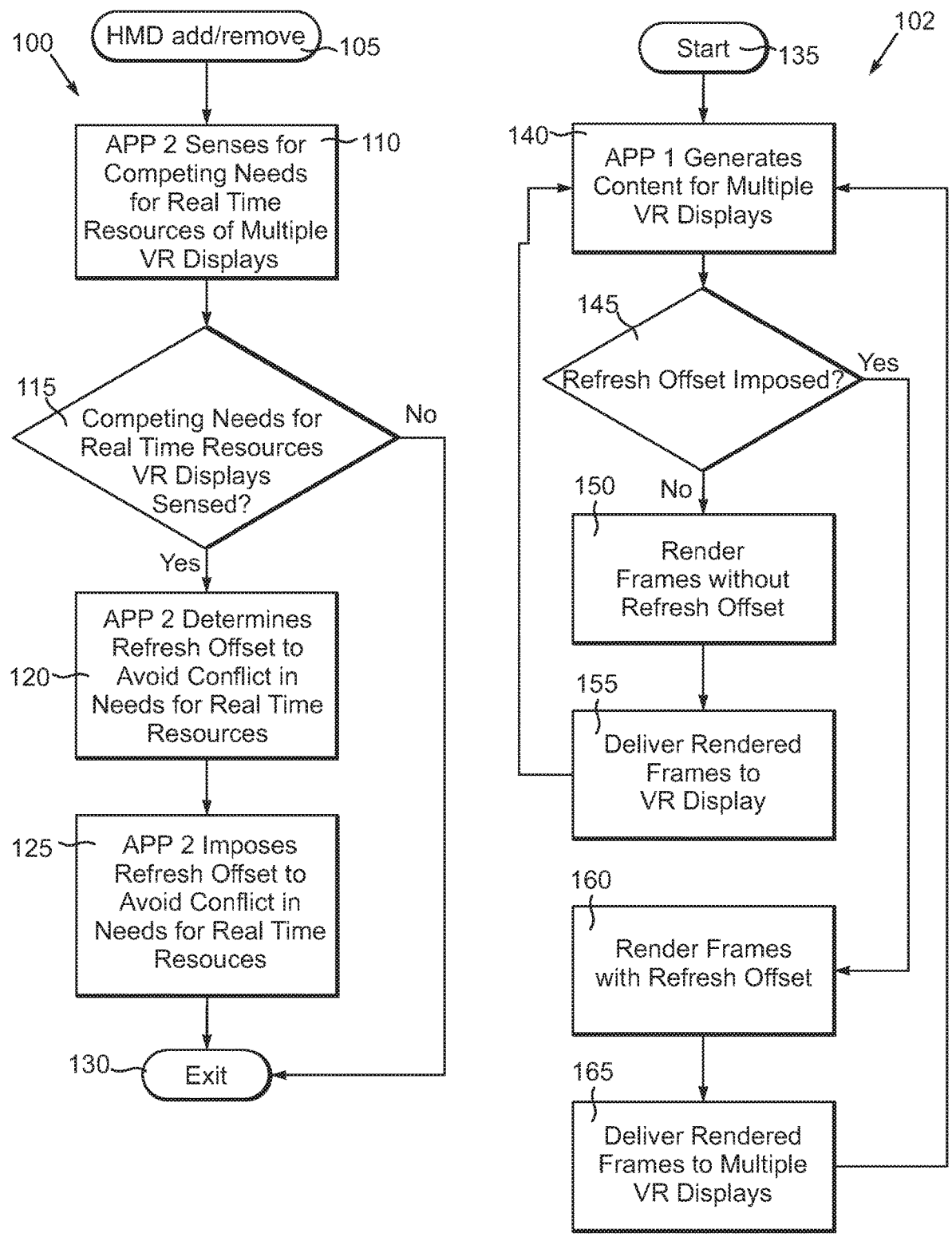
FIG. 6 is a flow chart depicting an exemplary process flow for delivering frames to one or more VR displays using selected refresh offset or not.
Figure 7:
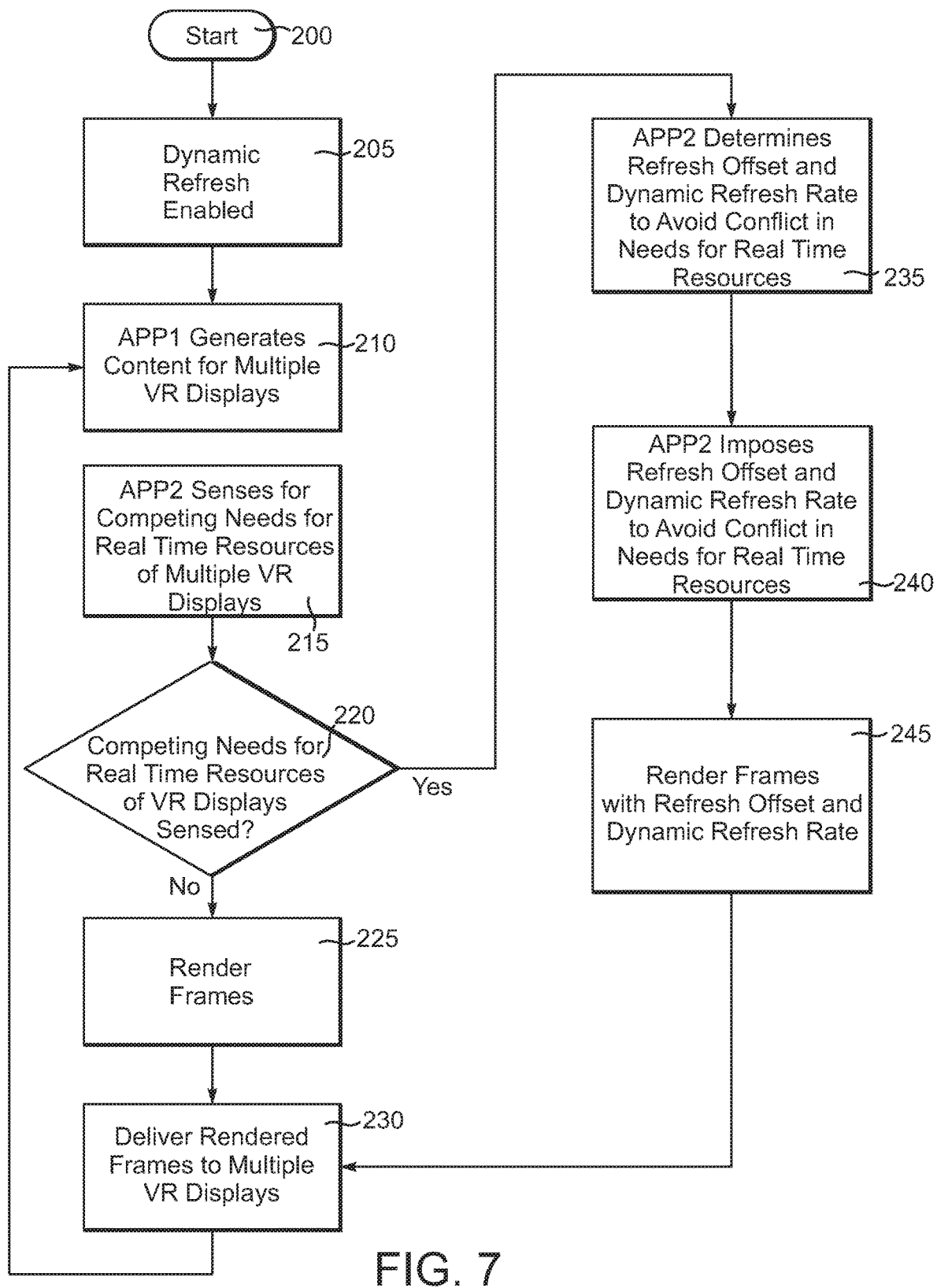
FIG. 7 is a flow chart depicting an exemplary process flow for delivering frames to multiple VR displays using selected refresh offset and dynamic refresh.

A couple of exemplary process flows are illustrated graphically in FIGS. 6 and 7. FIG. 6 depicts an exemplary process flow without dynamic refresh enabled and FIG. 7 to be discussed below depicts an exemplary process flow with dynamic refresh enabled. FIG. 6 depicts two parallel process loops 100 and 102 that can be asynchronous. Process loop 100 handles the sensing for competing resource requests, and selection and imposition of selected refresh offsets. Thus at step 105, an HMD is added or removed from the computing device 15 shown in FIG. 1. At step 110, an application, for example APP 2 implemented as a VR compositor or similar functionality, senses for competing needs for real time resources of multiple VR displays. This entails sensing the number of VR displays, such as HMD1, HMD2, etc., connected to the computing device 15. A single detected VR display will not generate competing needs for real time resources, but two or more will. If, at step 115, competing needs for real time resources of one or more VR displays are sensed then the process flow proceeds to step 120 and the APP 2 determines an appropriate refresh offset (or offsets) in order to avoid conflict in the needs for real time resources. This determination will take into account how many competing VR displays, such as HMD1, HMD2, etc. are detected—added VR displays will require more refresh offsets and removed VR displays will require fewer refresh offsets. Next at step 125 the APP 2 imposes the refresh offset (or offsets) to avoid conflict in needs for real time resources and then the process proceeds to loop exit at step 130. If, however, at step 115, competing needs for real time resources of one or more VR displays are not sensed then the process flow skips to exit at step 130. The loop is triggered on whenever VR displays are connected or disconnected. The content generation loop 102 proceeds in parallel. Thus following start at step 135, at step 140 the APP 1 generates content for multiple VR displays, such as HMD1, HMD2, etc. Step 145 is a conditional that uses the outcomes of steps 120 and 125 of process loop 100. If at step 145, a Refresh Offset(s) is not imposed, such as would be the case if only one VR display is detected, the loop 102 proceeds to step 150 to render frames without refresh offset, then to step 155 to deliver the rendered frames to the single VR display and then back to step 140. If, however, at step 145 a Refresh Offset(s) is imposed, such as would be the case if multiple VR displays are detected, then the loop skips to step 160 and the frames are rendered with refresh offset (or offsets) followed by step 150 where the rendered frames are delivered to the multiple VR displays, such as HMD1, HMD2, etc. The loop 102 then loops back to step 140.

Figure 5:
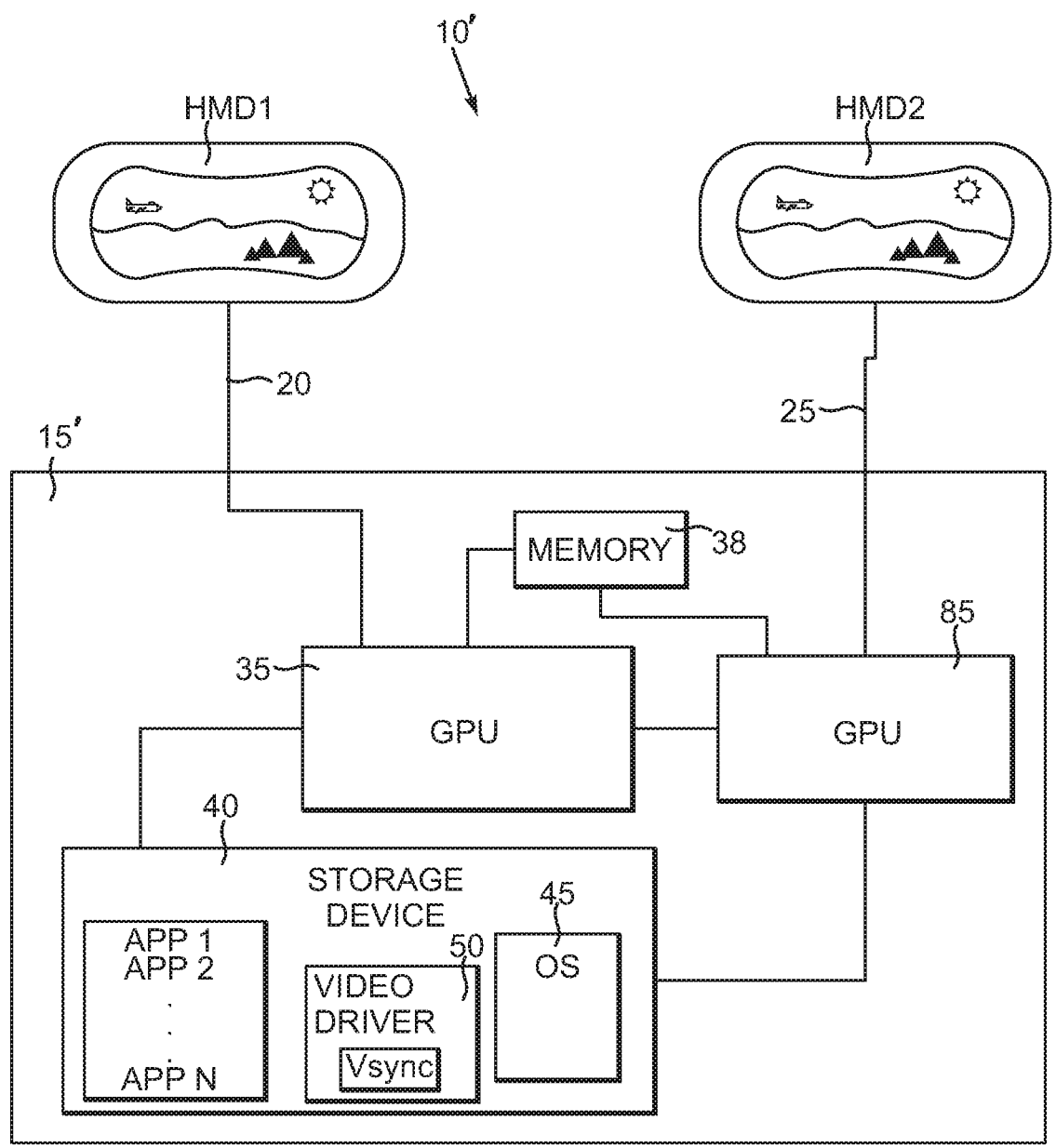
FIG. 5 is a schematic view like FIG. 1, but depicting an alternate exemplary VR computing system.

In an alternate exemplary variant, a process flow can use dynamic refresh by way of Freesync or some other type of dynamic refresh program. Referring now to FIG. 5, after a start at step 200, at step 205 dynamic refresh is enabled. At step 210, an application such as APP 1, generates content for multiple VR displays such as the display HMD1 and HMD2. Next, at step 215, the application APP 2 senses for competing needs for real time resources of multiple VR displays. For example, and as described above, APP 2 will sense for competing needs of ATW requests and partial or whole frame rendering of for example, HMD1 and HMD2. If at step 220, no competing needs are detected, then the process flow proceeds to step 225 and the frames are rendered, and then at step 230 the rendered frames are delivered to multiple VR displays. Step 230 is followed by a return to step 210. If, however, at step 220, application APP 2 senses competing needs for real time resources of multiple VR displays of one or more of VR displays, then the process proceeds to step 235 where the APP 2 determines a refresh offset and a dynamic refresh rate to avoid conflict in the competing needs for real time resources. Next at step 230 APP 2 imposes the selected refresh offset and dynamic refresh rate to avoid conflict in needs for real time resources, and thereafter at step 245 the frames are rendered with the selected refresh offset and dynamic refresh rate. Next, the process flow branches over to step 230 and the rendered frames are delivered to the multiple VR displays. Of course the process flows in FIGS. 6 and 7 can be accomplished with one or multiple applications and operating systems, etc. In other words, various levels of software integration, and hardware, can be used to implement the described steps.

While the invention can be susceptible to various modifications and alternative forms, specific variants have been shown by way of example in the drawings and have been described in detail herein. However, it should be understood that the invention is not intended to be limited to the particular forms disclosed. Rather, the invention is to cover all modifications, equivalents and alternatives falling within the spirit and scope of the invention as defined by the following appended claims.

What is claimed is:

1. A method of delivering video frame data to multiple head-mounted displays, comprising:
generating content for multiple head-mounted displays supporting dynamic refresh;
sensing competing needs for resources with real time requirements of the multiple head-mounted displays;
determining, based on the sensing, a selected refresh offset and a selected dynamic refresh rate for refreshes of the multiple head-mounted displays to avoid conflict between the competing needs for resources of the multiple head-mounted displays;
imposing the selected refresh offset and the selected dynamic refresh rate; and
delivering the content to the multiple head-mounted displays.

2. The method of claim 1, wherein the resources comprise computation for rendering and asynchronous time warp requests.

3. The method of claim 1, wherein the resources comprise computation for rendering and asynchronous time warp requests.

4. The method of claim 1, wherein the generating the content is performed by a single GPU.

5. The method of claim 1, wherein the generating the content for multiple head-mounted displays comprises generating the content for one of the multiple head-mounted displays using a GPU and generating or delivering the content for another of the multiple head-mounted displays using another GPU.

6. The method of claim 5, wherein the GPU is configured as a master and the another GPU is configured as a slave such that the master controls the selected refresh offset of frames generated or delivered by the slave GPU.

7. A method of delivering video frame data to multiple head-mounted displays, comprising:
running a first application on a computing device to generate content for multiple head-mounted displays supporting dynamic refresh;
sensing competing needs for resources with real time requirements of the multiple head-mounted displays using a second application;
using the second application to determine, based on the sensing, a selected refresh offset and a selected dynamic refresh rate for refreshes of the multiple head-mounted displays to avoid conflict between the competing needs for resources of the multiple head-mounted displays;
imposing the selected refresh offset and the selected dynamic refresh rate; and
delivering the content to the multiple head-mounted displays.

8. The method of claim 7, wherein the resources comprise computation for rendering and asynchronous time warp requests.

9. The method of claim 7, wherein the resources comprise computation for rendering and asynchronous time warp requests.

10. The method of claim 7, wherein the first application is run by a single GPU.

11. The method of claim 7, wherein the generating the content for multiple head-mounted displays comprises generating the content for one of the multiple head-mounted displays using a GPU and generating or delivering the content for another of the multiple head-mounted displays using another GPU.

12. The method of claim 11, wherein the GPU is configured as a master and the another GPU is configured as a slave such that the master controls the selected refresh offset of frames generated or delivered by the slave GPU.

13. A virtual reality computing system, comprising:
a computing device; and
a processor operable to perform instructions to generate content for multiple head-mounted displays supporting dynamic refresh, to sense for competing needs for resources with real time requirements of the multiple head-mounted displays, if competing needs for resources with real time requirements are sensed, to determine, based on the sensing, a selected refresh offset and a selected dynamic refresh rate for refreshes of the multiple head-mounted displays to avoid conflict between the competing requests for resources of the multiple head-mounted displays, to impose the selected refresh offset and the selected dynamic refresh rate, and to deliver the content to the multiple head-mounted displays.

14. The virtual reality computing system of claim 13, comprising the multiple head-mounted displays.

15. The virtual reality computing system of claim 13, wherein the processor comprises a CPU, a GPU or a combined CPU and GPU.

16. The virtual reality computing system of claim 13, wherein the computing device comprises another processor wherein the processor generates the content for one of the multiple head-mounted displays and the another processor generates or delivers the content for another of the multiple head-mounted displays.

17. The virtual reality computing system of claim 16, wherein the processor is configured as a master and the another processor is configured as a slave such that the master controls the selected refresh offset of frames generated or delivered by the slave processor.

* * * * *